United States Patent
Bakhir et al.

(10) Patent No.: US 12,054,413 B2
(45) Date of Patent: Aug. 6, 2024

(54) METHOD FOR PURIFICATION OF WATER AND WATER PURIFICATION SYSTEM

(71) Applicant: BLUE SAFETY GmbH, Münster (DE)

(72) Inventors: Vitold Bakhir, Moscow (RU); Jan Papenbrock, Münster (DE); Christian Mönninghoff, Münster (DE)

(73) Assignee: BLUE SAFETY GmbH, Münster (DE)

( * ) Notice: Subject to any disclaimer, the term of this patent is extended or adjusted under 35 U.S.C. 154(b) by 38 days.

(21) Appl. No.: 17/745,109

(22) Filed: May 16, 2022

(65) Prior Publication Data

US 2022/0371933 A1 Nov. 24, 2022

(30) Foreign Application Priority Data

May 19, 2021 (DE) .......................... 102021113023.9
Sep. 9, 2021 (EP) ...................................... 21195796

(51) Int. Cl.
*C02F 1/24* (2023.01)
*C02F 1/467* (2023.01)
(Continued)

(52) U.S. Cl.
CPC ................ *C02F 9/00* (2013.01); *C02F 1/004* (2013.01); *C02F 1/24* (2013.01); *C02F 1/46104* (2013.01);
(Continued)

(58) Field of Classification Search
CPC .......... C02F 1/24; C02F 1/465; C02F 1/4672; C02F 2201/46115; C02F 2301/08
See application file for complete search history.

(56) References Cited

U.S. PATENT DOCUMENTS 3,547,800 A 12/1970 Pan
2017/0113957 A1* 4/2017 Eckelberry ............... C02F 9/00

FOREIGN PATENT DOCUMENTS

RU        2329335 C2 *  7/2008
WO    2005075358 A1     8/2005

OTHER PUBLICATIONS

Sprint, Ute—WO 2005075358 A1 machine translation—Aug. 18, 2005 (Year: 2005).*

(Continued)

*Primary Examiner* — Bradley R Spies
(74) *Attorney, Agent, or Firm* — MagStone Law, LLP; Enshan Hong

(57) ABSTRACT

The invention relates to a method and a system for purification of water in a water purification system. The water purification system comprises first and second mixing reactors, first and second flotation reactors and first and second filters all serially and fluidly connected in a flow direction of the water as well as an electrolyzer. During the process, electrochemical synthesis of the reagents takes place in the cathode and anode chambers of the electrolyzer, respectively. Moreover, the electrochemically synthesized catholyte and anolyte are dosed into the water kept in the first and second mixing reactors, respectively. Then the mixtures in the first and second mixing reactors are mixed. After that, the flow of the treated water leaving the mixing reactors is passed through the first and second flotation reactors and afterwards through the first and second filters downstream of the first and second mixing reactors.

14 Claims, 1 Drawing Sheet

(51) Int. Cl.
    *C02F 9/00*      (2023.01)
    *C02F 1/00*       (2023.01)
    *C02F 1/461*      (2023.01)
    *C02F 103/06*     (2006.01)

(52) U.S. Cl.
    CPC ........ *C02F 1/4672* (2013.01); *C02F 2103/06* (2013.01); *C02F 2201/46115* (2013.01); *C02F 2201/4614* (2013.01); *C02F 2201/46145* (2013.01); *C02F 2301/08* (2013.01); *C02F 2303/04* (2013.01)

(56)            References Cited

OTHER PUBLICATIONS

Bakhir, Vitold M.—RU2329335C2 machine translation—Jul. 20, 2008 (Year: 2008).*
European Application No. 21195796.4, Extended European Search Report mailed Mar. 3, 2022, 7 pages.

* cited by examiner

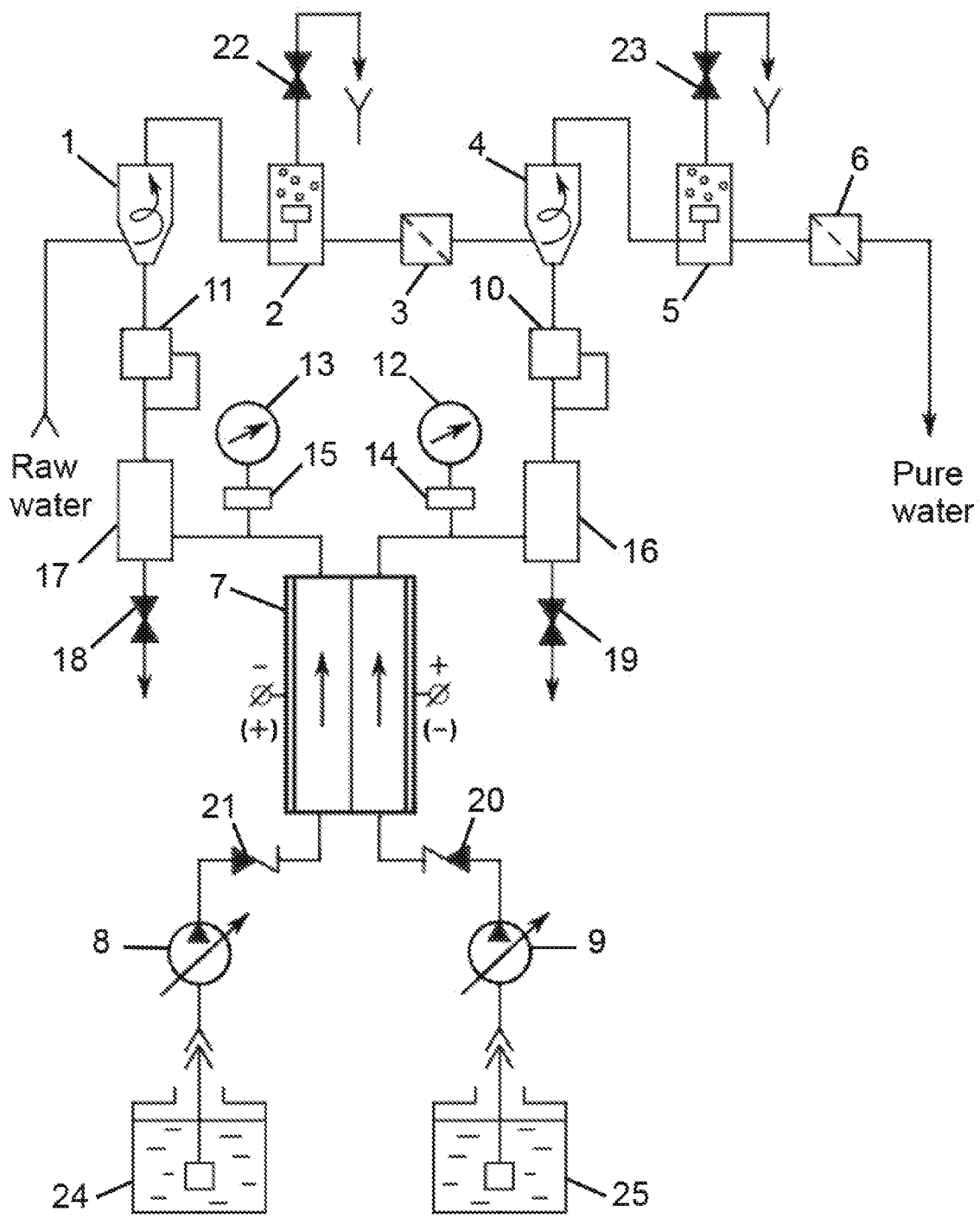

METHOD FOR PURIFICATION OF WATER AND WATER PURIFICATION SYSTEM

CROSS REFERENCE TO RELATED APPLICATIONS

This application claims priority of European Patent Application No. 21195796.4 filed on Sep. 9, 2021 and German Patent Application No. 102021113023.9 filed on May 19, 2021, both of which are hereby incorporated by reference in their entireties.

The invention relates to a method for purification of water and a water purification system intended for use in municipal water systems, and in particular, for purification of water from surface and underground sources with a high level of iron, manganese, heavy metals, hardness, organic compounds, and/or content of microorganisms.

In order to convert water from river, lake, spring or well into drinking water, it is necessary to decontaminate it from microorganisms and microbial toxins, as well as, as necessary, from access amount of hardness, heavy metal ions, unwanted and harmful organic compounds (humic acids, phenols, surfactants, petroleum products, herbicides, pesticides) and suspended solids. In some cases, it is necessary to adjust the chemical composition and physical-chemical properties of water (to carry out conditioning).

The experience accumulated in the world in drinking water quality control, which is reflected in WHO documents and international water quality standards, made it possible to formulate several concepts for drinking water quality control, the most important of which are the following:

Drinking water should be epidemiologically safe, free from toxic chemical composition and have favorable organoleptic properties.

Microbiological criteria for water safety have priority over chemical criteria. Chemical contamination of drinking water can be harmful to human health, but the consequences of outbreaks of microbiological contamination are many times higher than those of chemical ones.

Water usually represents an aqueous solution of substances in different aggregate state with complex chemical compositions. It contains inorganic ions ($Na^+$, $K^+$, $Ca^{2+}$, $Mg^{2+}$, $Fe^{3+}$, $Fe^{2+}$, $Al^{3+}$, $NH_4^+$, $Cl^-$, $HCO_3^-$, $SO_4^{2-}$, $NO_3^-$, $NO_2^-$, $F^-$, $SiO_3^{2-}$, $HS^-$, $CO_3^{2-}$, etc.), dissolved gases ($O_2$, $CO_2$, $N_2$, $H_2S$), micro particles of solid impurities, organic substances of natural and man-made origin, microorganisms and their metabolic products.

Totally dissolved impurities are found in water in the form of ions, separate molecules, complexes, or consist of several molecules. The size of these particles is less than $10^{-6}$ mm. In totally dissolved stage, gases, as well as ions and molecules of inorganic and organic substances, including microbial toxins, are present in the water. Colloidally dispersed impurities have particle sizes of approximately $10^{-6}$-$10^{-4}$ mm. Each of the particles is formed by a large agglomerate of molecules (there may be several thousand). These impurities can be of both organic and inorganic origin. Impurities in the form of suspended solids have a particles size of more than $10^{-4}$ mm. These can be represented by plant debris, clay or particles of sand, etc.

The purification of the whole variety of ingredients of diverse physical and chemical nature (hydrophilic, hydrophobic, charged, uncharged), whose sizes differ hundreds of thousands of times, according to the formulated criteria for drinking water quality is an extremely difficult task not only for household water treatment devices, but also for most modern industrial water treatment systems.

In recent decades, new types of contaminants have appeared, and their concentrations have been steadily increasing not only in surface water but also in ground water. Antibiotics, antidepressants, hormones, other pharmaceutical products and biologically active substances have been entering the water reservoirs and rivers from the municipal wastewater, agricultural livestock, poultry farms, and greenhouses. These biologically active compounds easily overcome the "barriers" of the existing water purification plants at both wastewater treatment and at municipal water purification plants.

Purification and conditioning of water have traditionally been conducted mainly through coagulation, flocculation, sedimentation, sorption, flotation, filtration, ion exchange, disinfection, desalination, pH adjustment, aeration for control of dissolved gases composition. All these processes have been implemented by various methods—chemical (dosing of coagulants, flocculants, disinfectants/oxidizing agents, buffers, etc.), electrochemical (electrodialysis, electro-flotation, electrocoagulation, electrolyzes of sodium hypochlorite), physical (ultrasound, UV treatment, high-voltage spark discharge), mechanical (sedimentation, aeration, filtration, rapid mix, hydrocyclone separation). The basic general flow chart for surface water treatment process at municipal plant, for example, from a river, includes the following main stages: coagulation, flocculation, sedimentation, filtration, disinfection (see, for example, Water Quality & Treatment. A Handbook of Community Water Suppliers. American Water Works Association. 5th edition. Technical Editor Raymond D. Letterman. McGRAW-HILL, INC., 1999, pages 3.14-3.25-[1]). The coagulation and flocculation processes are necessary for the removal of sediments and suspended solids and are conducted by the mixing of water with chemical reagents—coagulants and flocculants. To enhance such purification process, some stages of technological process have to be repeated or supplemented with additional water treatment steps designed to remove specific contaminants. The purification processes described above and referenced here are based on the combination of dosing chemical reagents for coagulation, flocculation and oxidation/disinfection, with intermediate stages of sedimentation and filtration, or, in other words, a combination of chemical and physical processes of water treatment. The main disadvantage of the known chemical methods is their unhandiness and inconvenience, as well as the difficulty of adapting the purification system to variations in the chemical composition, fluctuations in the degree of contamination, fluctuations in water flow rates, and the low rates of physical and chemical processes. A much higher efficiency of physico-chemical processes and the flexibility of water purification systems are the main characteristic of the electrochemical methods. For example, the removal of ions of bivalent iron, manganese, organic compounds, microorganisms from water by the implementation of oxidizing agents produced by electrolysis are the most common. Technological processes of electrochemical synthesis of substances for water treatment were developed together with the technology of hypochlorite solutions production at the end of the 19th century. The hypochlorite solution was obtained in a diaphragm-free electrolyzer, and therefore, in fact, both products of electrochemical synthesis—chlorine at the anode and sodium hydroxide at the cathode—were used simultaneously in the same solution. These products of electrolysis were sodium hypochlorite, which was formed by dissolving gaseous chlorine in an alkaline solution located in the interelectrode gap of the electrolyzer, and sodium hydroxide, which was present in the sodium hypochlorite solution as a stabilizer. With the appearance of chlor-caustic plants, the use of a more effective oxidizing agent—liquid chlorine—has become widespread. Methods of on-site production and use of electrochemically synthesized reagents—oxidizers turned out to be even more effective for water disinfection. Thus, there is a known water treatment method, according to patent GB2253860A, where the purifying water, containing chlorides of alkali and alkaline earth metals, flows through the anode chamber of the diaphragm electrolyzer and undergoes electrochemical treatment at the anode. The pressure in the anode chamber must be greater than the pressure in the cathode chamber to prevent the highly active products of cathodic reactions from migrating through the diaphragm to the anode chamber. During the electrolysis of water, the molecular chlorine is released at the anode from the chloride ions dissolved in treating water to form hypochlorous acid. Cations ions dissolved in treating water migrate through the diaphragm into the cathode chamber together with a small amount of water filtered through diaphragm due to the pressure drop across the diaphragm, as well as due to the influence of the electrophoretic forces. As a result, an alkaline solution, enriched with hydroxides of alkaline and alkaline-earth metal is formed in the cathode chamber due to electrochemical reactions. The disadvantage of this method is in its limitation to the water treatment by oxidation of organic compounds, ions of ferrous iron and manganese, microorganisms, as well as in its dependence of the effectiveness of the water treatment/oxidation on the chemical composition or ionic strength of the sourced water. In the absence of chlorides or in case of very low salinity, this method will be inefficient.

There is a method of treating water sequentially in the anode, and then in the cathode chamber of the diaphragm electrolyzer, followed by filtration of the water flow through the carbon filter: U.S. Pat. No. 5,540,819. Water disinfection and oxidation of bivalent iron and manganese ions occurs in the anode chamber and in the water lines prior to entering the cathode chamber. In the cathode chamber, oxides of polyvalent metals are converted into insoluble hydroxides and separated on the filter installed after the cathode chamber. In addition, a filter containing granular carbon material, for example anthracite, makes it possible to reduce the concentration of chlorine oxygen oxidants formed through the anode treatment of processing water, such as hypochlorous acid and sodium hypochlorite, to allowed levels. The disadvantage of this method is in its direct mixing, without filtration or separation, of products obtained by anodic oxidation with products obtained by cathodic reduction, which inevitably leads to partial neutralization of the effects of physical-chemical reactions and reduces the actual treatment efficiency of the electrochemically synthesized substances. Another disadvantage of this method is the dependence of the process efficiency on the chemical composition and concentration of electrolytes dissolved in the processing water.

There are a number of methods and devices for electrochemical water purification, which have been manufactured in Russia since 1991 and have the common name "IZUMRUD": (RU 2038322, RU 2038323, RU 2056364, RU 2090517, RU 2091320, RU 2096337, RU 2040477, RU 2149835, RU 2207982, RU 2322395, RU 2322394). All of these methods and devices have one or more flow-through diaphragm electrolytic cells, which are connected hydraulically into one flow-through process of water treatment. Also, some of these technological processes of water treatment include a separate flow of auxiliary electrolyte (drainage line) formed by processing of purifying water. Technological steps of water purification in these devices include a number of auxiliary chambers, such as flotation chambers, averaging-out chambers, catalytic reactors, loaded with large grains of quartz, carbon filter. A common disadvantage of these systems is low productivity (no more than 100 liters per hour), the complexity of descaling of cathode chambers, the inability to flexibly change the chemical composition of the dissolved solids generated through the electrolysis, oxidizing and reducing ingredients and, accordingly, the dependence of the treatment efficiency on the chemical composition and concentration of dissolved solids in the treating water. The disadvantages also include the need to use a relatively high voltage, due to the low electrical conductivity of fresh water. At the same time, a very small current output of electrolysis products limits the system performance to just a few dozen liters per hour.

There is a method of regulating the composition and properties of anolyte and catholyte active substances produced in the process of unipolar electrochemical exposure to water or initial water-salt solutions of reagents: U.S. Pat. No. 5,427,667. However, despite the possibility of electrochemical synthesis of chemical reagents—oxidizers and reducing agents—from water with high current efficiency and almost complete electrochemical conversion of salts dissolved in water, the chemical composition of the synthesized reagents may unpredictably change in accordance with the chemical composition of the source water, which is unacceptable by microbiological safety considerations for purified water.

In U.S. Pat. No. 6,004,439, the possibility of the parameters and properties of water control is solved by introducing the reagents obtained by an electrochemical method from an initial concentrated salt solution. This method makes it possible to obtain a stable oxidizing reagent for water treatment, but there is no possibility of the full functional use of each of the electrochemically synthesized reagents, that is, only the oxidative activity of the anolyte and the pH-adjusting ability of the catholyte are used. A method and a device for disinfection and simultaneous softening of tap water are known, including mixing the processing water with reagents synthesized in the anode and cathode chambers of a diaphragm flow-through electrolyzer, i.e., with the anolyte and catholyte, respectively, followed by the water filtration (see EP-patent EP0175123A2). This prior technology is selected as a prototype to be improved by the present invention. In this technology, turbulizing elements arranged in the anode and cathode chambers establish a special efficient mixing device of freshly obtained products of anodic oxidation and cathodic reduction with the water flowing through the electrode chambers. Because of these elements, highly active products of electrolysis are efficiently and evenly distributed in the volume of water flowing through the electrode chamber. It allows using the excess physicochemical activity of freshly obtained products of reduction and oxidative reactions that take place in the electrical double layer on the surface of the cathode and anode of the diaphragm electrolyzer, respectively, in the water purification processes. The disadvantage of this method is the direct mixing, without separation through the filtration process, of products of anode oxidation and cathode reduction, which inevitably leads to partial mutual neutralization of the effects of physicochemical reactions and to a reduction of the efficiency of electrochemically synthesized substances. Another disadvantage of this method is the dependence of the process efficiency on the chemical composition and concentration of electrolytes dissolved in water. Another disadvantage of the method is the relatively low performance of the electrochemical water purification system due to the fact that all processing water flows through the electrode chambers of the diaphragm electrolyzer. The rate of water flow is largely determined by the cross-section of the electrode chambers and their length. An increase in the size of the cross section above the optimum entails higher power consumption. The loss of power efficiency is associated with the higher electrical resistance of the interelectrode space, filled with low conductive fresh water.

SUMMARY OF THE INVENTION

One object of the present application is to increase the efficiency of purification of water by reducing the concentration of soluble salts of calcium and magnesium, intensifying the processes
- of coagulation and flocculation,
- oxidation of organic compounds, ions of bivalent iron and manganese,
- the destruction of microorganisms of all types and forms,
- the conversion of ions of polyvalent metals into low soluble and insoluble hydroxides and their subsequent removal,
- expanding the range of regulation of the composition and properties of electrochemically synthesized reagents,
- increasing the reactivity of electrochemically synthesized reagents present in catholyte and anolyte by using them in the form of gas-liquid mixtures,
- reducing the duration of the process due to intensive mixing of water with reagents,
- achieving flexibility of the water purification system to the chemical composition of the water and
- achieving the requirements for purified (drinking) water.

According to the present application, a method for purification of water is provided.

This result is achieved by the method for purification of water using a water purification system, which contains stages of mixing water respectively with a catholyte and an anolyte containing reagents synthesized electrochemically in an electrolyzer, followed by filtration.

The water purification system includes a first mixing reactor, a first flotation reactor, a first filter, a second mixing reactor, a second flotation reactor and a second filter, wherein these components are all serially and fluidly connected in this order in a flow direction of the water. Furthermore, the water purification system also comprises an electrolyzer comprising a cathode chamber and an anode chamber. During the process, electrochemical synthesis of a catholyte and an anolyte each containing reagents takes place in the cathode and anode chambers of the electrolyzer, respectively. Moreover, one of the electrochemically synthesized catholyte and anolyte is dosed into the water in the first mixing reactor. The method continues with mixing the one of the electrochemically synthesized catholyte and anolyte with the water in the first mixing reactor. After that, the flow of the treated water leaving the first mixing reactor is passed through the first flotation reactor and through the first filter. Then the other one of the electrochemically synthesized catholyte and anolyte is dosed into the treated water leaving the first filter. Again, mixing of the other one of the electrochemically synthesized catholyte and anolyte with the treated water takes place in the second mixing reactor. After that, the flow of the treated water leaving the second mixing reactor is passed through the second flotation reactor and through the second filter.

In a preferred embodiment of the invention, it is provided that the electrochemically synthesized catholyte and anolyte are dosed into the water and/or into the treated water leaving the first filter in the form of a gas-liquid mixture, preferably under the pressure of 0.1 to 2. 5 bar.

In another preferred embodiment of the invention, it is provided that the electrochemically synthesized catholyte and anolyte are dosed into the water and/or into the treated water leaving the first filter in the form of a gas-liquid mixture, preferably with the ratio of the volumes of liquid and gas in the range of 1:10-1:1000.

Preferably, catholyte and anolyte synthesized electrochemically in the cathode and anode chambers of the electrolyzer are generated and applied in the water treatment system in the form of gas-liquid mixtures catholyte and anolyte under pressure from 0.1 to 2.5 bar and/or with a ratio of the volumes of liquid to gas in the range of 1:10-1:1000, which allows to increase the number of functionally significant products of electrolysis and increase their activity by preventing the neutralization and preserving them in the form of microdroplets of a wet gas, the cathode chamber comprising hydrogen, and the anode chamber comprising a mixture of oxygen and chlorine, chlorine dioxide and carbon dioxide. Further, the process preferably comprises the stage of their mixing with the stream of water in the reactors of intensive (near perfect) mixing, for example in vortex mixers installed in series along the water stream for each of the injected reagents, and, after each of the mixers, the stream of the treated water is passed sequentially through the appropriate flotation reactor and filter. At the same time, the technological process of water purification consists of multiple sequential steps, starting from the mixing of (raw) water with a catholyte and anolyte generated in one of the electrolytic chambers of an electrolyzer, a flotation, a filtration, followed by the step of mixing of the filtrate of treated water with a reagent formed in the chamber of an opposite polarity of the electrolyzer, and sequential flotation and filtration. In a preferred embodiment of the invention, it is provided that an initial electrolyte solution feeding the cathode chamber and/or the anode chamber of the electrolyzer, is a sodium chloride solution, preferably having a sodium chloride concentration in the range from 0.5 to 50 g/l.

In a further preferred embodiment of the invention, it is provided that an initial electrolyte solution feeding the cathode chamber and/or the anode chamber of the electrolyzer, is a mixture of sodium carbonate and sodium chloride, preferably having a molar ratio of 1:10 to 1:100 and/or a total concentration of sodium carbonate and sodium chloride in the range from 0.5 to 50 g/l.

In a further advantageous embodiment of the method according to the invention the initial electrolyte solution feeding the electrolyzer is supplied only to one of the cathode and anode chambers, and purified water is fed into the other one of the cathode and anode chamber. Preferably, the composition and properties of the reagents obtained in the electrolyzer are controlled by varying a current strength and/or a feed rate into each of the cathode and anode chambers of the electrolyzer and/or the pressure drop across a membrane or diaphragm of the electrolyzer. It can be provided with advantage that a number of electrolyzers together with the respective associated mixers, flotation reactors, and filters, and/or the order of sequential input of the electrochemically synthesized catholyte and anolyte into the stream of water to be purified is selected depending on the chemical composition of the water and the required extent of water purification. The described technological process for purification of water allows providing an effective method for treatment of water from almost any source. The efficiency of this method is not affected by the concentration and chemical composition of the dissolved solids.

In a further preferred embodiment of the invention, it is provided that the same initial electrolyte solution is supplied to both the anode and cathode chambers of the electrolyzer.

According to another preferred embodiment of the invention the purified water fed into the other one of the cathode and anode chamber of the electrolyzer, preferably to the cathode chamber, is softened, purified water with a mineral content of not more than 0.3 g/l, preferably containing mainly sulfates, chlorides and carbonates of sodium and potassium as dissolved solids.

Furthermore, the invention relates to a water purification system, wherein the water purification system comprises:
- an electrolyzer comprising a cathode chamber and an anode chamber and adapted for electrochemically synthesizing a catholyte and an anolyte containing reagents from an initial electrolyte solution,
- a water flow path for supplying and transporting water,
- a first mixing reactor arranged in the water flow path and fluidly connected to one of the cathode chamber and the anode chamber of the electrolyzer and for mixing the water supplied to the water purification system with the one of the catholyte and analyte synthesized in the electrolyzer,
- a first flotation reactor arranged in the water path downstream of the first mixing reactor and a first filter for water purification arranged downstream of the first flotation reactor,
- a second mixing reactor arranged in the water supply path downstream of the first filter and fluidly connected to the other one of the cathode chamber and the anode chamber of the electrolyzer for mixing the treated water leaving the first filter with the other one of the catholyte and analyte synthesized in the electrolyzer,
- a second flotation reactor arranged in the water path downstream of the second mixing reactor and a second filter for water purification arranged downstream of the second flotation reactor.

Preferably, the electrolyzer is a diaphragm flow-through electrolyzer.

According to another preferred embodiment of the invention the first mixing reactor and/or the second mixing reactor is preferably a vortex mixer installed in the water stream.

BRIEF DESCRIPTION OF THE DRAWINGS

FIG. 1 presents a basic diagram for fresh water purification.

DETAILED DESCRIPTION OF PREFERRED EMBODIMENTS OF THE INVENTION

FIG. 1 shows a water purification system in accordance with a preferred embodiment of the present invention.

Pressurized water (raw water), in particular, natural fresh water, enters the highly efficient main technological water purification system (process) consisting of a series—connected first mixing reactor 1 (mixer 1), a first flotation reactor 2, a first filter 3, a first mixing reactor 4 (mixer 4), a second flotation reactor 5 and a second filter 6, all serially and fluidly connected in this order in a flow direction of the water, and leaves the process as ready-to-use by consumer (drinking (purified) water). The first mixing reactor 1 (mixer 1), first flotation reactor 2, first filter 3, second mixing reactor 4 (mixer 4), second flotation reactor 5 and second filter 6 are connected by a fluid carrying line. The first mixing reactor 1 is connected on the outlet side to the first flotation reactor 2. The first flotation reactor 2 is connected on the outlet side to the first filter 3. Downstream of the first filter 3, the second mixing reactor 4 is integrated into the fluid-carrying line. The second flotation reactor 5 is arranged downstream of the second mixing reactor 4. The second flotation reactor 5 is connected on the outlet side to the second filter 6. Further, the water purification system comprises a diaphragm flow-through electrolyzer 7, wherein a cathode chamber of the electrolyzer 7 is fluidly connected to the first mixer 1 and an anode chamber of the electrolyzer 7 is fluidly connected to the second mixer 4. The water purification system comprises a catholyte supply path and an anolyte supply path. The cathode chamber and the anode chamber of the electrolyzer 7 are on the inlet side fluidly connected via a catholyte supply line for supplying the catholyte to the cathode chamber and an anolyte supply line for supplying an anolyte to the anode chamber with dosing pumps 8 and 9, respectively. Products of electrolysis are dosed by the dosing pumps 8 and 9, the outputs of which are connected to the anode and cathode chambers of electrolytic cells of the diaphragm flow-through electrolyzer 7. Products of electrolysis are dosed under the pressure. The pressure in the electrolysis chambers of the diaphragm flow-through electrolyzer 7 is regulated "up to itself" by reducers 10 and 11 which are arranged in the fluid-carrying line downstream of the first and second mixers 1, 4 and upstream of the electrolyzer 7 and is controlled by means of pressure gauges 12 and 13 equipped with separators 14 and 15. The cathode chamber and the anode chamber of the electrolyzer 7 are each connected on the outlet side to an intermediate retention tank 17 and an intermediate retention tank 16. The intermediate retention tank 17 and the intermediate retention tank 16 are in turn connected on the outlet side to the reducers 10 and 11. Intermediate retention tanks 16 and 17 are used to feed products of electrolysis to the first and second mixers 1 and 4 and to remove the access amount of products of electrolysis from the process. The bottom parts of the retention chambers are connected to drainage lines by hydraulic resistances 18 and 19 that are adjustable from the fully locking to the not fully locking position.

To protect the dosing pumps 8, 9 from the products of electrolysis, check vales 20 and 21 are installed on the fluid carrying-lines of electrolyte entrance to the anode and cathode chambers of electrolyzer 7 upstream of the dosing pumps 8 and 9.

Discharge lines of flotation reactors 2 and 5 are equipped with control valves 22 and 23 that are installed to regulate the discharge volume of gas-liquid products of electrolysis.

Depending on the tasks of water purification process, one of the electrochemically synthesized catholyte and anolyte from the diaphragm flow-through electrolyzer 7 can be fed into the first mixer 1. In this case, respectively the other one of the electrochemically synthesized catholyte and anolyte will be dosed into the second mixer 4. A typical method of water purification for the single homes and small villages starts with the step of dosing the catholyte into the first mixer 1, and the anolyte is dosed into the second mixer 4. FIG. 1 describes this method of water purification. Example of the opposite water purification process, where the first step consists of dosing the anolyte into the first mixer 1, are purification of water with high microbial load, for example standing surface water. To simultaneously guaranty efficient protection of water from microbial growth for prolong time by providing residual oxidants and increasing the purification process efficiency, a second similar multistage process with reverse sequence of dosing of products of electrolysis can be added.

The input lines of the dosing pumps 8 and 9 consist of a flexible tubing for dosing initial electrolyte solutions, sodium chloride and sodium carbonate or sodium bicarbonate, from tanks 24 and 25, which are fluidly connected, and are equipped with a protective screen. Initial electrolyte solutions pumped into the cathode and anode chambers of the electrolyzer 7 may have different concentrations and/or different chemical compositions. It is also possible to feed the same initial electrolyte solution into both chambers of the electrolyzer 7 or to supply one of the chambers with the electrolyte, and the other chamber with purified water instead. In that case, as the water passes through one chamber of the electrolyzer 7, water becomes saturated with the corresponding ions from the other electrode chamber. The electrochemical process and products of electrolysis are controlled by regulating the flow rates of the electrolyte solution or purified water into the anode and cathode chambers of the electrolyzer 7 and/or the concentration of the dosing electrolyte and/or the applied current.

If softened, purified water with a mineralization of not more than 0.3 g/l, containing mainly sulfates, chlorides and carbonates of sodium and potassium as dissolved solids, is introduced into the cathode chamber of the electrolyzer instead of the electrolyte, then the products of cathode reactions are compounds formed by the reactions of electrochemical cathode decomposition of water and aqueous solutions of dissolved solids:

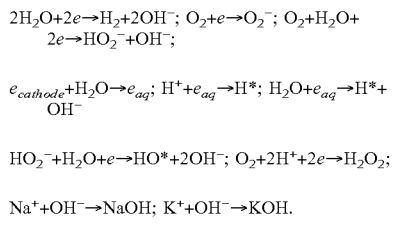

$2H_2O+2e \rightarrow H_2+2OH^-$; $O_2+e \rightarrow O_2^-$; $O_2+H_2O+2e \rightarrow HO_2^-+OH^-$;

$e_{cathode}+H_2O \rightarrow e_{aq}$; $H^++e_{aq} \rightarrow H^*$; $H_2O+e_{aq} \rightarrow H^*+OH^-$ $HO_2^-+H_2O+e \rightarrow HO^*+2OH^-$; $O_2+2H^++2e \rightarrow H_2O_2$;

$Na^++OH^- \rightarrow NaOH$; $K^++OH^- \rightarrow KOH$.

Electrochemically activated solution of products of cathode reduction, such as hydroxyl anion ($OH^-$), superoxide anion ($O_2^-$), peroxide anion ($HO_2^-$), molecular anion of water-exciton ($H_2O^-$), hydrated electron ($e_{aq}$), atomic hydrogen ($H^*$) and the hydroxyl radical ($HO^*$), possess an extremely high reactivity. The gas phase of catholyte is represented by wet hydrogen containing micro-droplets of moisture saturated with highly active products of cathodic reactions, including alkali metal hydrides. The concentration of monovalent metal hydroxides generated in the cathode chamber of the reactor of the electrolytic cell does not exceed 1-2 g/l. The pH value of catholyte is in the range of 13-14, which is caused by the extremely high activity of the products of cathodic electrochemical reactions (see Bakhir V. M., Pogorelov A. G., Universal Electrochemical Technology for Environmental Protection. International Journal of Pharmaceutical Research & Allied Sciences, 2018, 7 (1): 41-57. ISSN: 2277-3657 CODEN (USA): IJPRPM. Institute of Theoretical and Experimental Biophysics, Russian Academy of Sciences, Moscow Region, Pushino, Russia-[2]). However, the products of non-equilibrium electrochemical reactions contained in the microdroplets of gaseous products of electrolysis have a physicochemical activity that is much higher than the corresponding activity of the liquid media—catholyte and anolyte. Research of the proposed process during its development showed that the microdroplets of moisture in the gaseous products of anodic and cathodic reactions have an electric charge corresponding to the polarity of the electrode and contain highly active metastable compounds that are unable to exist in a large volume of water for more than a few tenths of a second. It was found that wet gaseous products of anodic and cathodic electrochemical reactions can shift the redox potential of water above the redox potential of water decomposition, specific to the extreme pH values. For example, when fresh (salinity of 0.25 g/l) tap water was mixed with gaseous products of cathodic reactions of electrolysis of the same water in the modular element MB-11T-07 [Patent GB 2479286], the ORP values were minus 900 mV, in the scale of normal hydrogen electrode, with an initial pH of water (before mixing) equal to 7.0, and a pH of water equal to 7.5, after mixing with gaseous products from the cathode chamber of the MB element. Also, the values of the redox potential of the same water mixed with the gaseous products of anode oxidation of the same water exceeded plus 1400 mV, in the scale of the normal hydrogen electrode, at a water pH of 6.5. Used equipment is described in Universal Electrochemical Technology for Environmental Protection. International Journal of Pharmaceutical Research & Allied Sciences (Bakhir V. M., Pogorelov A. G., Universal Electrochemical Technology for Environmental Protection. International Journal of Pharmaceutical Research & Allied Sciences, 2018, 7 (1): 41-57. ISSN: 2277-3657 CODEN (USA): IJPRPM. Institute of Theoretical and Experimental Biophysics, Russian Academy of Sciences, Moscow Region, Pushino, Russia-[2]).

The lifetime of the metastable substances in the microdroplets of wet products of electrolysis can range from several seconds to several minutes in the case of their isolation from the environment and depends on the physicochemical conditions of the wet gas interface. Microdroplets of liquid have an electric charge that keeps them in a gaseous medium at a distance from each other and prevents them from converging. For the cathode products of electrolysis, such a medium is hydrogen, where the droplets are negatively charged, for anode ones—chlorine, chlorine dioxide, oxygen, ozone, where the charge of the droplets is positive. When mixing a wet electrolysis gas with water, an instantaneous reaction occurs between highly active products of electrolysis and water and substances dissolved in it.

It was found that the redox potential of water shifts to the negative values by up to 300-800 mV as a result of dosing the gaseous and liquid cathodic products of electrolysis in ratio of 1 part of electrolytic products to 1 million parts of water. It also results in almost instant coagulation of the colloidal particles due to significant change in the activity of the dispersion medium, due to the reduction of redox potential, in comparison, the electrokinetic potential of colloidal particles is negligible.

In the course of experimental studies, it was found that the change in the ORP of water as a result of the introduction of gaseous or liquid products of cathodic electrochemical treatment in a weight ratio of 1 part reagent to 1 million parts of water changes towards negative values around 300-800 mV depending on the chemical composition of water. At the same time, almost instantaneous coagulation of colloids is observed, which is caused by a sharp change in the activity of the dispersion medium, accompanied by a decrease in the redox potential, in comparison with which the electrokinetic potential of colloidal particles is negligible.

The rapid destabilization of colloidal suspensions (coagulation) is followed by the flocculation process. The completion of the flocculation process with the formation of flakes and agglomerates of colloids occurs in the sediment layer of coagulated particles on the filter. The initial shift of the redox potential of water, its after mixing with the cathode or anodic products of electrolysis, as a rule, returns to equilibrium or close to it after the filtration stage.

When purifying water from ground or surface sources, for which the standard purification process (coagulation, flocculation, sedimentation, filtration, disinfection) is optimal, the stage of introduction of the catholyte into the first mixer 1 and the anolyte into the second mixer 4 is applied. The introduction of the gas-liquid mixture of highly active products of cathode process in the post cathode—first mixer 1 is accomplished by pump 8 of the electrochemical unit of the water purification system. In the first mixer 1 the reaction of interaction of active cathode products with water impurities occurs by injecting the reagent catholyte into the water stream. Since electrochemically activated cathode reduction products have anomalous chemical reactivity and catalytic ability, the speed of their interaction with dissolved impurities is many times greater than the speed of interaction of solutions of stable chemicals that are commonly used in standard water purification technologies. In the first mixer 1 reactions of formation of insoluble hydroxides of polyvalent metals, which include all heavy metals, as well as reactions of formation of hydroxides of iron, manganese, strontium, nickel, aluminum, calcium, and magnesium take place. The generalized reaction of formation of insoluble metal hydroxides is described by the equation:

$$Me^{n+} + n(OH^-) \rightarrow Me(OH)_n,$$

where Me is a polyvalent metal ion; and n is valence of the metal ion.

Insoluble flakes and microcrystals of heavy metal hydroxides, as well as hydroxides of iron, manganese, copper, zinc, calcium, magnesium, possess a very high sorption capacity and form complex compounds with various organic impurities dissolved in water. Upon entering the first flotation reactor 2 (for the purification process described here), a significant part of insoluble hydroxides of polyvalent metals present in the form of micro flakes with adsorbed organic compounds are removed together with a small amount of water (not more than one percent of the treated water stream) through the control valves 22 of the first flotation reactor 2. The moving force of the phase separation becomes the hydrogen bubbles that adhere to the surface of hydroxide micro-flakes and float them to the top of the first flotation chamber 2 to its fitting. The treated water together with the remaining hydroxide particles passes through the first filter 3, cartridge or quartz sand, where the remaining amount of microparticles, including the colloidal fraction, is separated. The removal of the colloidal particles on the first filter 3 is achieved by the electrokinetic effect in the newly formed hydroxide layer. The precipitates of hydroxides that accumulate on the filtration surface under the conditions of high reducing potential, condense under the force of strong electrostatic interaction of solids by forming an electron-donor porous structure, that comprise an electrosorption layer. When water is passed through this layer, formed on the filtering surface of any nature, the colloidal particles of hydroxides with organic compounds adsorbed on their surface are efficiently removed from the filtering water. Such electrosorption filters are the most effective for filtering out organic compounds with neutral or positively charged hydrated groups.

In the process of anode treatment of the same water passed through the anode chamber of diaphragm flow-through electrolyzer 7 by the dosing pump 9 (8) the following main chemical reactions take place simultaneously:

$$2H_2O - 4e \rightarrow 4H^+ + O_2; \quad O_2 + H_2O - 2e \rightarrow O_3 + 2H^+; \quad 2H_2O - 2e \rightarrow 2H^+ + H_2O_2;$$

$$3H_2O - 6e \rightarrow O_3 + 6H^+; \quad H_2O - 2e \rightarrow {}^*2H^+ + O^*; \quad H_2O - e \rightarrow H^+ + OH^*;$$

$$OH^- - e \rightarrow HO^*; \quad O_2 + 2OH^- - 3e \rightarrow O_3 + H_2O; \quad 3OH^- - 2e \rightarrow HO_2^- + H_2O;$$

$$H_2O_2 - e \rightarrow HO_2^* + H^+; \quad H_2O - e \rightarrow HO^* + H^+; \quad H_2O_2 - e \rightarrow HO_2^* + H^+;$$

When a cleaning water or an auxiliary electrolyte is passed through the anode chamber or from the cathode chamber through the diaphragm, the anions of chlorides, sulfates or carbonates together with molecular chlorine, ozone and chlorine dioxide convert into hypochlorous acid, peroxocarbonate and persulfate, with their conversion rate being proportional to the concentration and their electrochemical equivalents:

$$Cl^- + 4OH^- - 5e \rightarrow ClO_2 + 2H_2O; \quad Cl^- + H_2O - 2e \rightarrow HClO + H^+;$$

$$Cl^- + 2H_2O - 5e \rightarrow ClO_2 + 4H^+; \quad 2SO_4^{2-} - 2e \rightarrow S_2O_8^{2-}; \quad 2H_2CO_3 - 2e \rightarrow H_2C_2O_6 + 2H^+.$$

After coming out of the first filter 3 water enters the second mixer 4, where it mixes with the products of anode oxidation of the diaphragm flow-through electrolyzer 7 which are dosed by dosing pump 9 into the second mixer 4.

The main active ingredients of products of anode oxidation, also called the electrochemically activated anolyte, is a mixture of peroxide compounds—hydrogen peroxide ($H_2O_2$), peroxide anion ($HO_2^-$), singlet molecular oxygen ($^1O_2$), superoxide anion ($O_2^-$), ozone ($O_3$), oxygen radical ($O^*$) and chlorine-oxygen compounds—hypochlorous acid (HClO), hypochlorite-radical ($ClO^*$), dichlorine monoxide ($Cl_2O$) and chlorine dioxide ($ClO_2$).

All these substances are eubiotics, i.e. naturally produced by the human body, since the basis of pinocytosis and lysis of bacteria by phagocytes is the electrochemical synthesis of such substances from blood plasma.

Spontaneous decomposition of hydrogen peroxide in an aqueous solution is accompanied by the formation of compounds with very high antimicrobial activity (the corresponding chemical reactions are shown in parentheses): $HO_2^-$—hydroperoxide anion ($H_2O_2 + OH^- \rightarrow HO_2^- + H_2O$); $O_2^{2-}$—peroxide anion ($OH^- + HO_2^- \rightarrow O_2^{2-} + H_2O$); $O_2^-$—superoxide anion ($O_2^{2-} + H_2O_2 \rightarrow O_2^- + OH^- + OH^*$); $HO_2^*$—hydrogen peroxide radical ($HO^* + H_2O_2 \rightarrow H_2O + HO_2^*$); $HO_2$—superoxide of hydrogen ($O_2^- + H_2O \rightarrow HO_2 + OH^-$). At the same time, it is possible to form an extremely reactive singlet oxygen $^1O_2$: ($ClO^- + H_2O_2 \rightarrow {}^1O_2 + H_2O + Cl^-$). It was experimentally established that the molecular oxygen radical anion $O_2^-$ is involved in the phagocytosis reactions, by one of the ways described above.

It is known that the formation of active free radicals $ClO^*$, $Cl^*$, $HO^*$ is possible in an aqueous media in the presence of HClO and $ClO^-$: ($HClO + ClO^- \rightarrow ClO^* + Cl^- + HO^*$). Active hypochlorite radicals $ClO^*$ can take part in the formation of oxygen radical ($O^*$) and hydroxyl radical ($HO^*$): ($ClO^* + ClO^- + OH^- \rightarrow Cl^- + 2O^* + OH^*$). Further a chain reaction occurs during the formation of chlorine radical: $OH^* + Cl^- \rightarrow Cl^* + OH^-$. The resulting radicals, atomic oxygen radicals, take part in the destruction of the microorganisms, by interacting with biopolymers, which could be oxidized, for example, by the following reactions:

$RH_2 + OH^* \rightarrow RH^* + H_2O;$ $RH_2 + C^* \rightarrow RH^* + HCl;$ $RH_2 + O^* \rightarrow RH^* + OH^*.$ A chain of metastable compounds, formed in the process of phagocytosis, is a very effective biocide, as it participates in multitarget reactions of irreversible disruption of the vital functions of biopolymers of microorganisms at the level of electron transfer reactions. Metastable particles with different values of the electrochemical potential have a universal spectrum of action, i.e. they possess a biocidal effect on all large systematic groups of microorganisms (bacteria, mycobacteria, viruses, fungi, spores) without harming the human cells and other higher organisms, i.e. somatic animal cells as part of a multicellular system.

In the traditional methods of removing ions of bivalent iron and manganese, aeration (oxidation by air bubbling) is most often used, and chlorine, ozone, and potassium permanganate are used as oxidizing agents in mechanical filtration of water on sand or activated carbon loads. However, the effectiveness of these technologies is low, because the process of oxidation and the formation of flakes is rather long time consuming when using reagents in a thermodynamically equilibrium state.

In case of metastable reagents, the oxidation process proceeds almost instantly due to the high chemical activity of those reagents in addition to catalytic activities of the electron-accepting media. More to add, in the process of water purification with products of anode oxidation reaction of microbial decontamination completes almost instantly, microbial contamination of all types and forms (bacteria, mycobacteria, viruses, fungi, spores), microbial toxins, other organic compounds, including herbicides, pesticides, hormones, antibiotics, antidepressants are destroyed by oxidants. The destruction of living and inanimate organic matter occurs as a result of oxidation of products of anode electrochemical reactions in a catalytically active medium. In particular, organic manganese and iron that are difficult to remove from water are effectively removed when water is mixed with the products of anodic oxidation:

$Fe(OH)_2 + OH^- - e \rightarrow Fe(OH)_3;$ $2Fe(OH)_2 - 2e \rightarrow Fe_2O_3 + H_2O + H^+;$ $Mn^{2+} + 3H_2O - 2e \rightarrow Mn_2O_3 + 6H^+;$ $Fe(OH)_2 + H_2O - e \rightarrow Fe(OH)_3 + H^+;$ $Mn^{2+} + 2H_2O - 2e \rightarrow MnO_2 + 4H^+;$ $Mn^{2+} + O_3 + H_2O \rightarrow MnO(OH)_2 + H^+ + O_2;$ $Mn^{2+} + O_3 + H_2O \rightarrow MnO_2 + H^+ + O_2.$ The invention is illustrated by the following examples, which, however, do not exhaust all the opportunities of the invention.

EXAMPLES

Example 1

In the example a device assembled according to the FIG. 1 is used. The diaphragm flow-through electrolyzer in the device is represented by the flow-through electrochemical modular element MB-11T-07, manufactured in accordance with the patent GB 2479286. The tubular electrodes of the element and the ceramic ultrafiltration diaphragm installed between them are coaxially arranged. Extended electrode chambers, which are narrow annular gaps slightly wider than one millimeter between the walls of the electrodes and the diaphragm, working under increased pressure with a constant release of gas bubbles on the surface of the electrodes, provide conditions for the flow of liquids in the mode of displacement while simultaneously mixing at a significant pressure drop on the diaphragm. In modern alternative diaphragm flow-through electrolyzers, a similar set of features is absent. This allows us to refer to the flow-through electrochemical modular diaphragm element MB as an electrolyzer.

Water from an artesian well with the following composition was treated: chlorides—133 mg/l, sulfates—78 mg/l, nitrates—9 mg/l, nitrites—1.2 mg/l, iron—1.9 mg/l, magnesium—51 mg/l, calcium—64 g/l, manganese—1.2 mg/l, surfactants—1.1 mg/l, active chlorine—0 mg/l, total microbial count (TMC)—168 CFU/ml. It was supplied with a flow rate of 800 l/h into the system; the outflow through the drainage outlets of flotation reactors 2, 5 was 4 liters per hour. An electrolyte solution of sodium chloride and sodium bicarbonate mixture with a concentration of 10 g/l NaCl and 1 g/l NaHCO$_3$, respectively, was fed into the cathode chamber of the electrochemical element (diaphragm flow-through electrolyzer), and water free from suspended solids was fed into the anode chamber. The current applied to the MB element was 5 amps at 8 volts. As the result of the purification process, purified water had the following characteristics: chlorides—135 mg/l, sulfates—75 mg/l, nitrates—10 mg/l, nitrites—less than 0.01 mg/l, iron—0.01 mg/l, magnesium—45 mg/l, calcium—51 g/l, manganese—0.01 mg/l, surfactants—0.1 mg/l, free chlorine—0.15 mg/l, TMC—0 CFU/ml. That is, the indicators of purified water met sanitary standards for drinking water. The service life of the system during the tests was 150 hours, no biofilms or decrease in the purification process efficiency was observed.

Example 2

Water from the same source as described in example 1, and at a flow rate of 800 l/h, was fed to the same purification system as described in example 1. The electrolyte solution of sodium chloride and sodium carbonate with concentrations of 5 g/l and 0.5 g/l, respectively, was fed to the cathode and anode chambers of the electrolyzer. The applied current across electrolytic cell was 4.5 amperes at a voltage of 6.2 volts. At the outlet of the purification system, the purified water had the following characteristics: chlorides—130 mg/l, sulfates—74 mg/l, nitrates—10 mg/l, nitrites—less than 0.01 mg/l, iron—0.01 mg/l, magnesium—43 mg/l, calcium—52 g/l, manganese—0.01 mg/l, surfactants—0.07 mg/l, free chlorine—0.1 mg/l, TMC—0 CFU/ml. The purified water met the sanitary standards for drinking water. The service life of the system during the testi was 100 hours, no biofilms or decrease in the purification process efficiency were observed.

Example 3

A device assembled according to the process presented on FIG. 1 was used, with the same electrolyzer as in example 1. The difference was in the sequence of feeding the electrolysis products: A mixture of oxidants from the anode chamber of the electrolyzer was fed to the first mixer 1, and a mixture of products of cathodic electrochemical reactions was fed to the second mixer 4. A solution of sodium chloride 20 g/l and sodium carbonate 1 g/l was fed to the cathode chamber of the electrolyzer. Purified water obtained in the same system was fed into the anode chamber by a dosing pump under a pressure of 0.2 bar greater than in the cathode chamber. The applied current through the electrolyzer was 5 amperes at a voltage of 9 volts. The surface water (lake) was processed with the following compositions: chlorides—18 mg/l, sulfates—220 mg/l, nitrates—15 mg/l, nitrites—0.9 mg/l, iron—0.6 mg/l, active chlorine—0 mg/l, total microbial count (TMC)—more than 6000 CFU/ml. The flow rate of water was 600 liters per hour. At the end of the purification process, water had the following characteristics: chlorides—18 mg/l, sulfates—210 mg/l, nitrates—14 mg/l, nitrites—less than 0.01 mg/l, iron—0.01 mg/l, free chlorine—0.07 mg/l, TMC—0 CFU/ml.

Example 4

The purification process shown in FIG. 1 was used. Water was purified from a ground water source with a total mineralization of 0.3 g/l. The flow rate of water was 800 liters per hour. Distilled water was fed to the cathode chamber of the electrolyzer (element MB-11T-07), and sodium chloride solution 8 g/l and hydrochloric acid solution (30%) 2 g/l were fed to the anode chamber. The applied current through the reactor was 4 amperes at 8.5 volts.

The results of the water composition before and after purification are presented in the following table 1.

TABLE 1

| | Result measurement | | | | |
|---|---|---|---|---|---|
| Indicator | Source water | Purified water | Standard value | Units | Regulatory document |
| Organoleptic indicator | | | | | |
| Turbidity | 2.9 | 0 | ≤2.6 | EMF | PND F 14.1:2:4.213-05 |
| Color | 4.6 | 0 | ≤20 | degree | GOST 31868-2012 |
| Odor | 2 | 0 | ≤2 | mark | GOST P57164-2016 |
| Flavor | 0 | 0 | ≤2 | mark | GOST 3351-74 |
| Generalized indicators | | | | | |
| pH | 7.35 | 7.5 | 6.0-9.0 | pH units | PND F 14.1:2:3:4.121-97 |
| General hardness | 6.38 | 6.35 | ≤7 | mg-equ/l | GOST 31954-2012 |
| Permanganate oxidizability | 0.96 | 0.66 | ≤5.0 | mg/dm$^3$ | PND F 14.1:2:4.154-99 |
| Dry residue | 326 | 362 | Within 1000 | mg/dm$^3$ | PND F 14.1:2:4.114-97 |
| Specific electrical conductivity | 568 | 607 | — | µS/cm | RD 52.24.495-2005 |
| Total alkalinity | 6.12 | 6.28 | — | mmol/dm$^3$ | GOST 31957-2012 |
| Free alkalinity | 0 | 0 | — | mmol/dm$^3$ | GOST 31957-2012 |
| Cations | | | | | |
| Ammonium | 0 | 0 | 2.0 | mg/dm$^3$ | FR.1.31.2013.16570 |
| Iron total | 0.49 | 0 | 0.3 | mg/dm$^3$ | PND F 14.1:2:4.135-98 |
| Potassium | 3.2 | 3.3 | 20 | mg/dm$^3$ | PND F 14.1:2:4.135-98 |
| Magnesium | 21.6 | 21.9 | — | mg/dm$^3$ | PND F 14.1:2:4.135-98 |
| Manganese | 0.038 | 0 | 0.1 | mg/dm$^3$ | PND F 14.1:2:4.135-98 |
| Calcium | 92 | 91 | — | mg/dm$^3$ | PND F 14.1:2:4.135-98 |
| Anions | | | | | |
| Hydrocarbonates | 373 | 383 | — | mg/dm$^3$ | GOST 31957-2012 |

TABLE 1-continued

| Indicator | Source water | Purified water | Standard value | Units | Regulatory document |
|---|---|---|---|---|---|
| Result measurement | | | | | |
| Carbonates | 0 | 0 | — | mg/dm$^3$ | GOST 31957-2012 |
| Fluorides | 0.44 | 0.58 | 1.5 | mg/dm$^3$ | GOST 31867-2012 |
| Chlorides | 1.1 | 22.9 | 350 | mg/dm$^3$ | GOST 31867-2012 |
| Nitrates | 0 | 1.09 | 45 | mg/dm$^3$ | GOST 31867-2012 |
| Sulphates | 9.4 | 10.6 | 500 | mg/dm$^3$ | GOST 31867-2012 |
| Microbiological indicators | | | | | |
| Total Microbial Count TMC (mesophilic aerobic and facultative aerobic) | Solid growth | 0 | No more than 50 | The number of bacteria colonies formed in 1 cm$^3$ (CFU/ml) | MUK 4.2.1018-01 |
| Common colymorphic bacteria (colibacillus bacteria group coliforms) | Found | 0 | Absence | Number of bacteria in 100 cm$^3$ | MUK 4.2.1018-01 |
| Thermotolarent coliform bacteria | Found | 0 | Absence | Number of bacteria in 100 cm$^3$ | MUK 4.2.1018-01 |

Example 5

The purification process shown in FIG. 1 was used. Water from example 4 was subjected to purification. The conditions for water purification were similar to those described in example 4, except for the water flow rate, which was 200 l/h. An aqueous solution of streptomycin with a concentration of $1*10^{-4}$ mol/l was introduced into the water entering the water purification system at a distance of 20 meters from the entrance to mixer 1 through a 0.5 liter pressurized tank using a dosing pump to create a concentration of antibiotic in processing water ten times greater than the lower limit of sensitivity ($2*10^{-6}$ mol/l) of the electrochemical method for analyzing an antibiotic. To determine the initial concentration of streptomycin upstream to mixer 1, a water sample was taken from the sampling port (not shown in FIG. 1) and analyzed for streptomycin content using volt-ampermetric method (see Fedorchuk V. A. Voltamperometric determination of streptomycin and chloramphenicol in drugs and food products. Thesis for the degree of candidate (PhD) of chemical sciences. Tomsk, 2003-[3]). The streptomycin content in the water was in the range of $(4.5-5.2)*10^{-5}$ mol/l based on 5 samples analyzed. At the outlet of the water purification system the streptomycin concentration was below the lower sensitivity limit of the method (less than $2*10^{-6}$ mol/l).

As can be seen from the above results, the use of the present invention allows to increase the degree of water purification and thus increase the efficiency of the process, since the use of the invention virtually eliminates the biofilms accumulation and prevents equipment from biofouling without the need to use additional disinfection stages. The quality of water purification is increased due to the use of a mixture of oxidants.

We claim:

1. A method for purification of water using a water purification system wherein the water purification system comprises: a first mixing reactor, a first flotation reactor, a first filter, a second mixing reactor, a second flotation reactor, and a second filter, all serially and fluidly connected in this order in a flow direction of the water, as well as an electrolyzer comprising a cathode chamber and an anode chamber, the method comprising the following steps:
   electrochemically synthesizing a catholyte and an anolyte each containing reagents in the cathode chamber and the anode chamber of the electrolyzer, respectively,
   dosing of one of the electrochemically synthesized catholyte and anolyte into the water and mixing the one of the catholyte and anolyte with the water in the first mixing reactor,
   passing the flow of the treated water leaving the first mixing reactor through the first flotation reactor and through the first filter,
   dosing of the other one of the electrochemically synthesized catholyte and anolyte into the treated water leaving the first filter and mixing the other one of the catholyte and anolyte with the water in the second mixing reactor, and
   passing the flow of the treated water leaving the second mixing reactor through the second flotation reactor and through the second filter.

2. The method according to claim 1, wherein the electrochemically synthesized catholyte and anolyte are dosed into the water and/or into the treated water leaving the first filter in the form of a gas-liquid mixture.

3. The method according to claim 1, wherein an initial electrolyte solution feeding the cathode chamber and/or the anode chamber of the electrolyzer, is a sodium chloride solution.

4. The method according to claim 1, wherein an initial electrolyte solution, feeding the cathode chamber and/or the anode chamber of the electrolyzer is a mixture of sodium carbonate and sodium chloride.

5. The method according to claim 1, wherein the initial electrolyte solution feeding the electrolyzer is supplied only to one of the cathode chamber and the anode chamber, and purified water is fed into the other one of the cathode and anode chamber.

6. The method according to claim 1, wherein the composition and properties of the reagents obtained in the electrolyzer are controlled by varying a current strength and/or a feed rate into each of the cathode chamber and the anode chambers of the electrolyzer and/or the pressure drop across a membrane or diaphragm of the electrolyzer.

7. The method according to claim 1, wherein a number of electrolyzers together with the respective associated mixers, flotation reactors and filters and/or the order of sequential input of the electrochemically synthesized catholyte and anolyte into the stream of water to be purified is selected depending on the chemical composition of the water and required extent of water purification.

8. The method according to claim 1, wherein the same initial electrolyte solution is supplied to both the anode chamber and the cathode chamber of the electrolyzer.

9. The method according to claim 5, wherein the purified water fed into the other one of the cathode chamber and the anode chamber of the electrolyzer is softened, and wherein the purified water has a mineral content of not more than 0.3 g/l.

10. The method according to claim 2, wherein the electrochemically synthesized catholyte and anolyte are dosed into the water and/or into the treated water leaving the first filter in the form of the gas-liquid mixture under a pressure of 0.1 to 2.5 bar.

11. The method according to claim 2, wherein the gas-liquid mixture has a ratio of liquid to gas by volume in a range of 1:10-1:1000.

12. The method according to claim 3, wherein the sodium chloride solution has a sodium chloride concentration in the range from 0.5 to 50 g/l.

13. The method according to claim 4, wherein the mixture of sodium carbonate and sodium chloride has a sodium carbonate to sodium chloride molar ratio of 1:10 to 1:100 and/or a total concentration of sodium carbonate and sodium chloride in the range from 0.5 to 50 g/l.

14. The method according to claim 9, wherein the purified water is fed into the cathode chamber, and the purified water contains sulfates, chlorides, and carbonates of sodium and potassium as dissolved solids.

* * * * *